(12) United States Patent
Abbing

(10) Patent No.: US 10,851,524 B2
(45) Date of Patent: Dec. 1, 2020

(54) METHOD AND APPARATUS FOR FLOW MEASUREMENT IN A FLUID DISTRIBUTION SYSTEM HAVING A NUMBER OF FLUID TAP UNITS

(71) Applicant: 3EFLOW AB, Luleå (SE)

(72) Inventor: Erik Abbing, Luleå (SE)

(73) Assignee: 3EFLOW AB, Lulea (SE)

( * ) Notice: Subject to any disclaimer, the term of this patent is extended or adjusted under 35 U.S.C. 154(b) by 0 days.

(21) Appl. No.: 16/474,675

(22) PCT Filed: Dec. 20, 2017

(86) PCT No.: PCT/EP2017/083822
§ 371 (c)(1),
(2) Date: Jun. 28, 2019

(87) PCT Pub. No.: WO2018/122065
PCT Pub. Date: Jul. 5, 2018

(65) Prior Publication Data
US 2019/0316330 A1  Oct. 17, 2019

(30) Foreign Application Priority Data

Dec. 30, 2016  (SE) ...................... 1651758

(51) Int. Cl.
*E03B 1/04* (2006.01)
*G01F 1/34* (2006.01)

(52) U.S. Cl.
CPC . *E03B 1/04* (2013.01); *G01F 1/34* (2013.01)

(58) Field of Classification Search
None
See application file for complete search history.

(56) References Cited

U.S. PATENT DOCUMENTS

| 5,636,653 | A | | 6/1997 | Titus | |
|---|---|---|---|---|---|
| 5,705,734 | A | * | 1/1998 | Ahmed | F24F 11/0001 73/1.35 |
| 5,902,927 | A | * | 5/1999 | Titus | G01F 1/34 73/30.02 |
| 6,076,542 | A | * | 6/2000 | Titus | G01F 1/34 137/14 |
| 7,739,921 | B1 | * | 6/2010 | Babcock | A62C 99/00 169/16 |
| 2008/0272211 | A1 | * | 11/2008 | Rann | B01F 15/00344 239/410 |
| 2012/0185102 | A1 | | 7/2012 | Skoglund et al. | |
| 2012/0211085 | A1 | | 8/2012 | Abbing | |
| 2013/0269813 | A1 | | 10/2013 | Jang | |

(Continued)

*Primary Examiner* — Harshad R Patel
(74) *Attorney, Agent, or Firm* — Servilla Whitney LLC

(57) ABSTRACT

A method and an apparatus are disclosed for measuring of fluid flow in a fluid distribution system, including a centrally located fluid source which is connected via separate feeding conduits to a number of fluid tap units, each including at least one fluid tap. The method comprises the steps of providing, for each said separate feeding conduit, a first fluid pressure sensor located anywhere along the separate feeding conduit or in the associated fluid tap unit, and a second fluid pressure sensor, serving as a reference pressure sensor common to all of the feeding conduits and being located adjacent to the centrally located fluid source. Each of the first and second fluid pressure sensors are connected to a control unit.

17 Claims, 8 Drawing Sheets

(56) References Cited

U.S. PATENT DOCUMENTS

2015/0277446 A1* 10/2015 Peczalski ............ G05D 7/0635
137/1
2015/0338254 A1 11/2015 Gysling et al.

* cited by examiner

OPEN

CLOSED

Fig.8
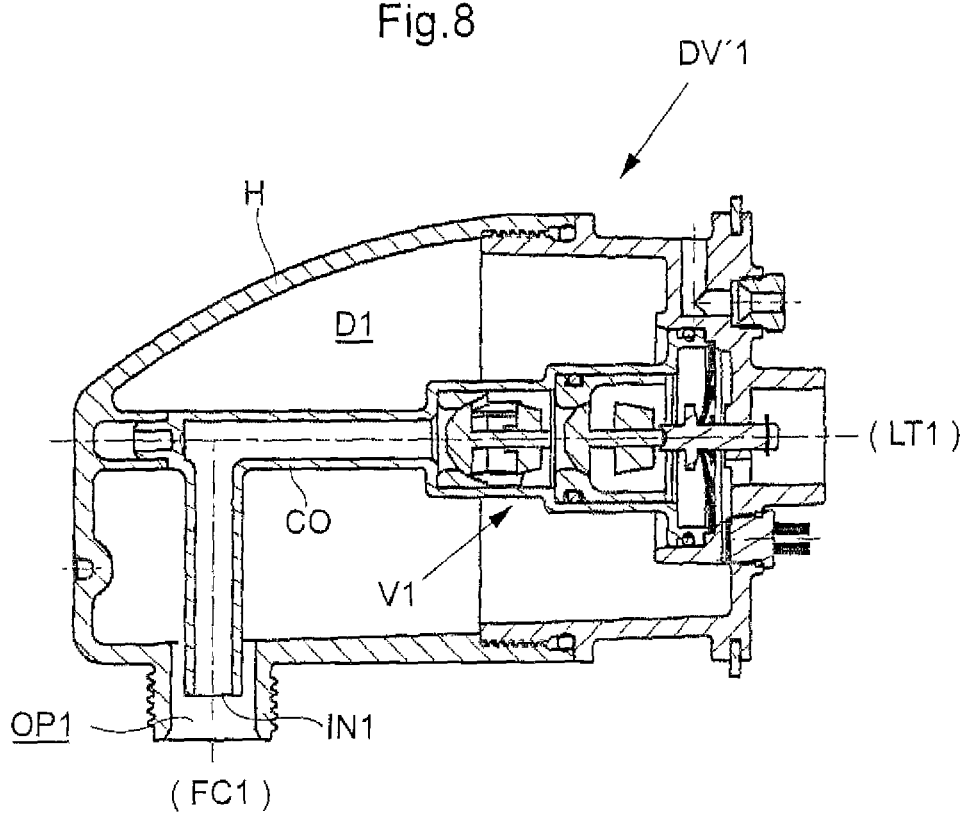
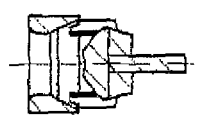
OPEN
Fig.8A
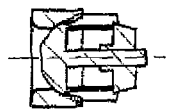
CLOSED
Fig.8B

METHOD AND APPARATUS FOR FLOW MEASUREMENT IN A FLUID DISTRIBUTION SYSTEM HAVING A NUMBER OF FLUID TAP UNITS

CROSS REFERENCE TO RELATED APPLICATIONS

This is a National Phase entry of International Application No. PCT/EP2017/083822, filed Dec. 20, 2017, which claims priority to Sweden Patent Application No. 1651758-3, filed Dec. 30, 2016, the disclosures of which are incorporated herein by reference in their entireties.

FIELD OF THE INVENTION

The present invention relates to a method and an apparatus for fluid flow measurement in a fluid distribution system having a number of fluid tap units, e.g. in a building with separate apartments, Each fluid tap unit includes at least one fluid tap, e.g. a water tap, such as a cold water tap or a hot water tap, or a water tap for mixed cold and hot water, or some water consuming house-hold machine.

More specifically, the method and the apparatus are intended to be used in water distribution systems of the kind having centrally located water source, possibly one source for cold water and another source for hot water, the water source being connected to a number of water tap units, e.g. in associated apartments, via separate feeding conduits.

In particular, the method and the apparatus according to the present invention are especially useful in systems of the kind disclosed in an earlier PCT application PCT/EP2016/064867, filed by the same applicant as the present application, i.e. a system for saving liquid and thermal energy, where the water is evacuated from the associated feeding conduit after completion of a tapping operation at an associated water tap unit, by generating a backward pressure gradient in said associated feeding conduit, by means of an evacuation pump, so that the water flows backwards towards the water source and the associated feeding conduit thereafter contains only gas being retained therein, and refilling, upon activating the water tap unit, the associated feeding conduit with water by generating a forward pressure gradient, normally by opening a control valve to the water source, in the associated feeding conduit and to permit water to flow from the water source to the associated water tap unit, while pushing the remaining gas in the feeding conduit towards the associated water tap unit at an operating pressure exceeding an ambient air pressure level.

In the system disclosed in the earlier PCT application referred to above, each feeding conduit stands in communication with an associated dampening chamber, during the entire operation of the water distribution system, via an associated passage accommodating an inlet to a water valve, which is connected to the associated water tap unit, wherein the feeding conduit, the associated passage and the associated dampening chamber form, in use, a closed system being separated, in respect of the remaining gas therein, from the ambient air.

Accordingly, the present invention is especially useful in such an energy saving system, although it can also be used in other systems as defined in the opening paragraph above, and in the preambles of the independent claims 1 and 11.

BACKGROUND OF THE INVENTION AND PRIOR ART

As mentioned above, the present invention is primarily intended to be used in an energy saving water distribution system of the kind disclosed in the PCT application PCT/EP2016/064867. However, there are also other pertinent prior art documents, such as the published PCT application WO 2012/1408351, also filed by the same applicant as the present application. In the latter disclosure, there is described a system where, during a refilling step, the motion of water will be effectively dampened, when it approaches a separate gas passage, by means of a compressible volume of gas being pushed in front of the water moving rapidly towards a tap unit.

OBJECT OF THE INVENTION

Now, the main object of the present invention is to provide a fluid flow measurement method and apparatus for measuring the fluid flow in a fluid distribution system of the kind referred to above, by very simple means, and without using, during normal operation, expensive flow meters adjacent to the fluid inlet at each separate fluid tap unit.

SUMMARY OF THE INVENTION

This object is achieved, according to the present invention, by a method and an apparatus as set forth below, and in detail in the appended claims, wherein the method comprises the steps of providing, for each separate feeding conduit, a first fluid pressure sensor located anywhere along the separate feeding conduit or in the associated fluid tap unit, and a second fluid pressure sensor, serving as a reference pressure sensor common to all of the feeding conduits and being located adjacent to the centrally located fluid source, and electronically connecting each of the first and second fluid pressure sensors to a control unit adapted to determine the water pressures at said first and second pressure sensors, including the difference between these two fluid pressures, and, on the basis of the determination of the fluid pressures and the pressure difference, calculate the flow of fluid through each separate feeding conduit, at least as long as there is a fluid flow at any fluid tap unit, and wherein the apparatus comprises:

a first fluid pressure sensor located in each of said feeding conduits or in the associated fluid tap unit, a second fluid pressure sensor, serving as a common reference pressure sensor and being located adjacent to the centrally located fluid source, a central control unit being coupled to the first and second fluid pressure sensors and being adapted to determine the fluid pressures at the first and second fluid pressure sensors, including the difference between these two pressures, the central control unit also including a calculation part adapted to calculate, on the basis the determination of the water pressures and the pressure difference, the flow of fluid through each of the separate feeding conduits.

A number of further advantageous features are stated in the dependent claims, and in the detailed description below.

Accordingly, some preferred embodiments of the method and the apparatus according to the invention will be explained further below, with reference to the appended drawings.

BRIEF DESCRIPTION OF THE DRAWINGS

FIGS. 4, 5, 6, 7A, 7B, and 8, 8A, 8B show a number of modified embodiments of the dampening valve unit of FIG. 3.

DETAILED DESCRIPTION OF A PREFERRED EMBODIMENT OF THE INVENTION

The first part of the description below is an exact copy of the disclosure in applicant's earlier Swedish patent application No. 1550941-7, and the second part that follows relates to the present invention being implemented in a system of the general kind disclosed in said earlier patent application.

Detailed Disclosure of Swedish Patent Application No. 1550941-7

In the description below, the liquid distribution system is intended for hot water, e.g. in a building. However, those skilled in the art will realize that the system may alternatively be used for any other liquid. Furthermore, the system may alternatively be used for the distribution of cold water or some other cold liquid.

Figure 1:
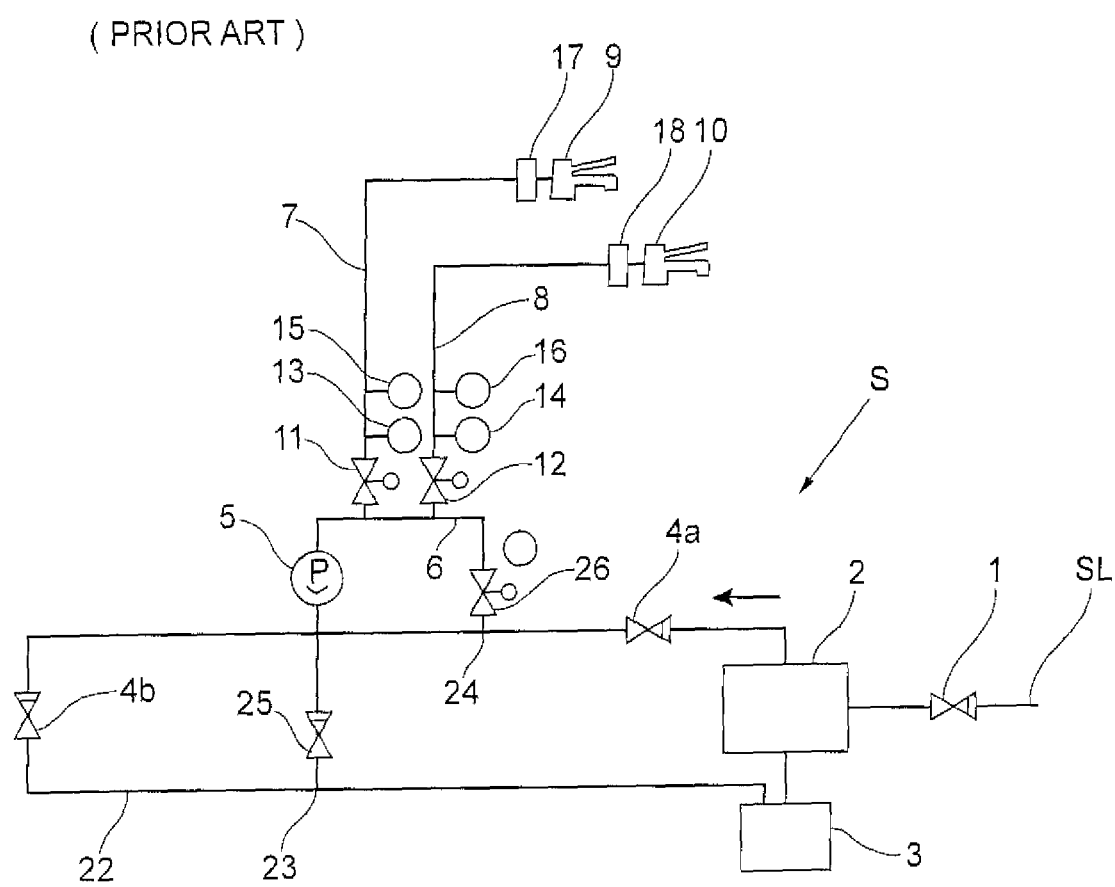
FIG. 1 illustrates schematically a prior art liquid distribution system as disclosed in the above-mentioned PCT application WO 2012/1408351.

In the prior art system shown in FIG. 1, water is supplied from a source S of fresh water, e.g. a public water supply line SL or a local water supply, via a non-return valve 1 to a hot water tank 2, where the water is heated to a relatively high temperature, typically in the interval 60-90° C. There is a re-circulating loop 22 of hot water passing through the water heater 2 and a hydro-pressure vessel 3 serving to accommodate a variable volume of air or gas at an operating pressure. The hot water is circulated by means of a circulation pump (not shown) adjacent to the heater 2, and two further non-return valves 4a,4b will ensure that the circulation is maintained in one direction only. Moreover, there is a hot water feed line 6 bridging the loop 22 at two points 24 and 23. In the hot water feed line 6, there is a pump 5 for circulating hot water along the feed line 6. The pump 5 will operate even in case all hot water feeding conduits 7, 8, leading to various hot water tap units 9, 10 in a building, are passive or closed, so that the liquid remaining in the feeding conduits may be evacuated. Thus, the pump 5 has a dual purpose.

In each hot water feeding conduit 7, 8, adjacent to the connection to the hot water source 5, there is a control valve 11 and 12, respectively, which can be opened or closed, a level sensor 13 and 14, respectively, and a pressure sensor 15 and 16, respectively. All these components are located centrally, near the hot water source, together with the hot water tank 2 and the circulating loop 22 with its bridging line 6. In the hot water bridging line 6, there is also a non-return valve 25 and a control valve 26.

The hot water tank 2, the re-circulating loop 22 and the bridging hot water line 6 may be regarded as a heat source or hot water source S, since the circulating water is always kept at an elevated temperature and will continuously supply hot water to the hot water feeding conduits 7, 8. If necessary, the hot water source may be contained in an insulated enclosure, or the components may be individually covered with by an insulating material.

As described in the above-mentioned PCT application WO2012/148351, hot water will only be present in the liquid feeding conduits 7, 8 when hot water is being tapped from the respective tap unit 9 and 10. When the tap unit 9, 10 is being closed, possibly after a short delay (e.g. a few minutes) which does not significantly affect the temperature of the hot water in the conduit, the hot water remaining in the respective feeding conduit will be pumped out in the backward direction by means of the pump 5, back to the hot water source 2, 22. In this process, the hot water will be replaced by ambient air or gas in the liquid conduit 7, 8. However, when the hot water has been evacuated, the respective valve 11, 12 will be closed, and a gas or air pressure, slightly below the ambient atmospheric air pressure, will remain in the feeding conduit 7, 8.

When hot water is going to be tapped again from the tap 9 or 10, a refilling operation will be initiated. The present invention provides for an improved method and system, as illustrated schematically in FIG. 2.

A central liquid source LS, possibly corresponding to the hot water source 2, 22 in FIG. 1, is connected to a number of hot water feeding conduits FC1, FC 2, etc. via a feed line FL, separate connections C1, C2, etc. and individual control valves CV1, CV2, etc. When the control valve CV1 is opened, hot water will flow rapidly into the associated feeding conduit FC1 which has been evacuated in a previous evacuation step.

There will be a high pressure gradient in the feeding conduit FC1, since the control valve CV1 is open and thus conveys a driving pressure from below, corresponding to the pressure prevailing in the liquid source LS (typically about 2 to 5 bars over-pressure or, in absolute terms, more than 300% of the ambient air pressure), and an upper very low pressure, such as 0.2 to 0.8 bar under-pressure or, in absolute terms, about 20 to 80% of the ambient air pressure. Accordingly, the hot water will flow at a high velocity towards the water tapping unit LT1. Normally the feeding conduits are at least 5 to 30 m long, from the liquid source LS to the respective hot water tap unit LT1, etc. within a building. When the hot water approaches the liquid tap unit, there is a risk for a hard striking impulse, a so called "water hammer", of the hot water. However, as is known per se, from the above-mentioned PCT application WO 2012/1408351, a dampening chamber D1 is arranged in the vicinity of a liquid valve V1, so that an air or gas cushion will dampen the impact of the rapidly moving hot water.

According to the present invention, each dampening chamber D1, D2, etc. is connected to the end of the associated feeding conduit FC1, FC2, etc. via a passage OP1, OP2, etc. In this passage, there is an inlet to a liquid valve unit V1, V2, etc., e.g. a stop valve, a non-return valve or a check valve. See also FIGS. 3,4,5,6 and 7A, 7B, 8, 8A, 8B.

The structure of the dampening valve unit DV1, DV2, etc. (see FIGS. 3, 3A, 3B) is disclosed in detail in two separate patent applications being filed at the same day as the present application, denoted "a dampening valve" and "a fluid stop valve", respectively. Thus, the liquid valve unit V1, V2 may comprise two check-valves VA1, VA2 connected in series, being biased towards a closing position by a pressure responsive part, e.g, a non-linear spring device S1, comprising two mirrored diaphragm springs, so that the valve will shift from a closing position (FIG. 3B) to an open position (FIG. 3A) when a threshold pressure level has been reached at the inlet IN1, IN2, etc. of the valve. The non-linear spring device S1, etc. is such that, when the threshold pressure is reached, the valve body will move suddenly a relatively long way into its opening position (to the right in FIG. 3). So, the valve will open distinctly and permit a high flow of hot water immediately after the threshold pressure level has been reached.

Figure 3:
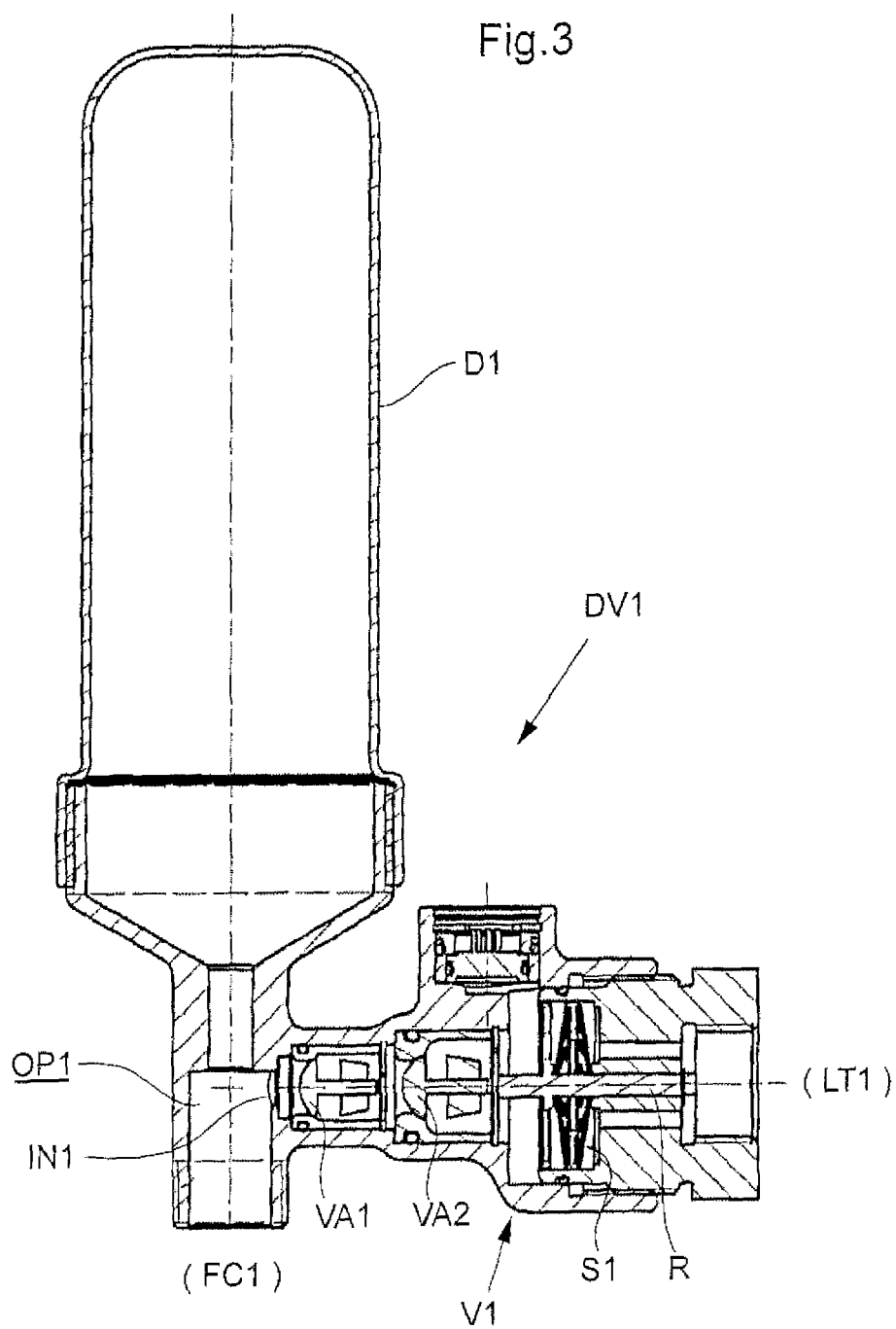
FIGS. 3, 3A, 3B show, in sectional views a dampening valve unit being used in the system of FIG. 2.
Figure 3A:
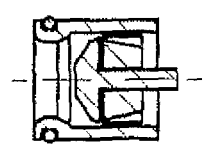
Figure 3B:

The spring device S1 is coupled to the two check-valves VAL VA2 by means of an axial rod R, so that the end positions of the spring device will be transferred to the check valves which will thus be open (FIG. 3A) or closed (FIG. 3B).

The dampening chamber D1, D2, etc. can be housed in a separate casing (as shown in FIGS. 3, 4, 5, 6, 7A, 7B), or it can be formed by a housing where the liquid valve V1 is located centrally (FIG. 8). In either case, the upper end of the feeding conduit FC1, FC2, etc. (FIG. 2) adjoins the above-mentioned passage OP1, OP2, etc., which also accommodates the inlet IN1, IN2, etc. of the valve V1, V2, etc.

The prevailing pressures and the volumes of the feeding conduits FC1, FC2, etc. are such that the pressure of the refilling water is still relatively low when it reaches the passage OP1, OP2, etc., below the set threshold pressure of the valve. Therefore, the water will move further upwards, beyond the passage OP1, OP2, etc. before the air or gas, being trapped in the adjoining dampening chamber D1, D2, etc., is compressed to such a degree that the air or gas pressure, causing a corresponding pressure in the water adjacent thereto, rises to a level corresponding to the threshold level of the valve V1, V2, etc. Then, the valve suddenly opens, and the hot water will flow through the valve into the adjoining liquid tap unit LT1, LT2, etc. Since there is now only water in the passage OP1, OP2, etc., only water, an no gas or air, will flow through the valve and into the liquid tap LT1, LT2, etc. The pressure in the liquid source LS, being much higher than the ambient air pressure (even at the liquid tap unit LT1, LT2, etc.) and the threshold pressure of the liquid valve V1, V2, etc., will ensure that the air or gas compressed in the dampening chamber D1, D2, etc. will stay compressed and not expand into the passage OP1, OP2, etc. during normal operation of the liquid distribution system.

As an alternative to opening the liquid valve upon reaching a threshold pressure, it is possible to provide a sensor that senses the presence of liquid in the passage OP1, OP2, etc. at the inlet IN1, IN2, etc. of the liquid valve V1, V2, etc. The sensor can be a level sensor, an optical sensor or a float sensor, in combination with a corresponding actuator, e.g. an electromagnetic device or a mechanical actuator, which will open the liquid valve V1, V2, etc. upon sensing the presence of liquid.

Only when the tap handle, or a corresponding device or sensor, is activated for closing the particular liquid tap unit LT1, LT2, etc. will there be a change. Then, a pressure sensor PS1, PS2, etc. (see FIG. 2), inserted between the valve V1, V2, etc. and the associated liquid tap unit LT1, LT2 (or at some other location adjacent to the liquid valve or the liquid tap unit), will sense an increased pressure (the flow is stopped but the feeding pressure is still present) and send an electric signal to a control unit CU which will in turn close the control valve CV1, CV2, etc. adjacent to the liquid source LS. The control unit CU will also send a signal to a separate evacuation valve EV1, EV2, etc. so as to open the latter. This evacuation valve is arranged in a branch connection located downstream (as seen when the feeding conduit is refilled) but adjacent to the control valve CV1, CV2, etc. The evacuation valves EV1, EV2, etc. are jointly connected to an evacuation pump EP which will recirculate the hot water to the liquid source LS.

The pressure sensors PS1 and PS2 are schematically shown to be connected to the (short) conduit between the liquid valve V1, V2, etc. and the liquid tap unit LT1, LT2. However, alternatively, they may be arranged inside the casing of the liquid valve, at the outlet side thereof, or at or adjacent to the liquid tap unit itself.

Of course, instead of sending an electric signal via a control unit, it is possible, as disclosed in the above-mentioned PCT application WO 2012/148351, to let a pressure pulse or other physical variable propagate along the feeding conduit to the liquid source, where the pulse or other physical variable is sensed and used to trigger the closing of the control valve CV1, CV2, etc. and the opening of the evacuation valve EV1, EV2, etc.

When the particular feeding conduit FC1, FC2, etc. is connected to the liquid source via the evacuation valve EV1, EV2, etc., the liquid (hot water) will be sucked back by the evacuation pump EP into the liquid source LS. There is also a level sensor LS1, LS2, arranged to sense the liquid level at (or adjacent to) the branch connection. When this sensor senses that the liquid surface has reached a lowermost level, this indicates that all the liquid has been evacuated (removed) from the associated feeding conduit FC1, FC2, etc. An alternative is just to sense the low pressure adjacent to the control valve or the evacuation valve, the low pressure indicating that virtually all liquid has been evacuated from the feeding conduit.

Thus, at this time there will be a very low pressure, such as 0.5 bar under-pressure (50% of the ambient air pressure), or a pressure in the interval 0.2-0.8 bar under-pressure in the particular feeding conduit FC1, FC2, etc. Then, a signal is sent to the control unit CU, which will close the evacuation valve EV1, EV2, etc., so that the associated feeding conduit is retained in an evacuated state, and there will be no thermal loss due to heat being dissipated from the feeding conduit. In the feeding conduit FC1, FC2, etc. there is only gas or air left at a very low pressure (almost vacuum). A new refilling cycle can begin, being triggered or initiated by the opening of one of the liquid tap units.

The arrangement of the control valves CV1, CV2, etc. and the evacuation valves EV1, EV2, etc., being located separately in the branch connections, has the advantage that any one or a number of feeding conduits FC1, FC1, etc. can be evacuated independently of each other. Therefore, one or more of the feeding conduits FC1, FC2 may be evacuated while one or more of the other feeding conduits FC2, FC1, etc. are being refilled or are operative for tapping hot water at the associated liquid tap unit LT2, LT1, etc. In the prior art system as shown in FIG. 1, on the other hand, this was not possible. Rather, it was necessary to wait until all the feeding conduits were non-operative before it was possible to connect them to a jointly operating pump.

The special liquid distribution unit, comprising the feed line FL, the control valves CV1, CV2, etc., the separate evacuation valves EV1, EV2, etc. and the jointly connected evacuation pump EP, is disclosed in more detail in a separate patent application, entitled "a liquid distribution unit" being filed on the same date by the same applicant.

The modified embodiments in FIGS. 4, 5, 6, 7A, 7B and 8, 8A, 8B will now be described briefly.

Figure 4:
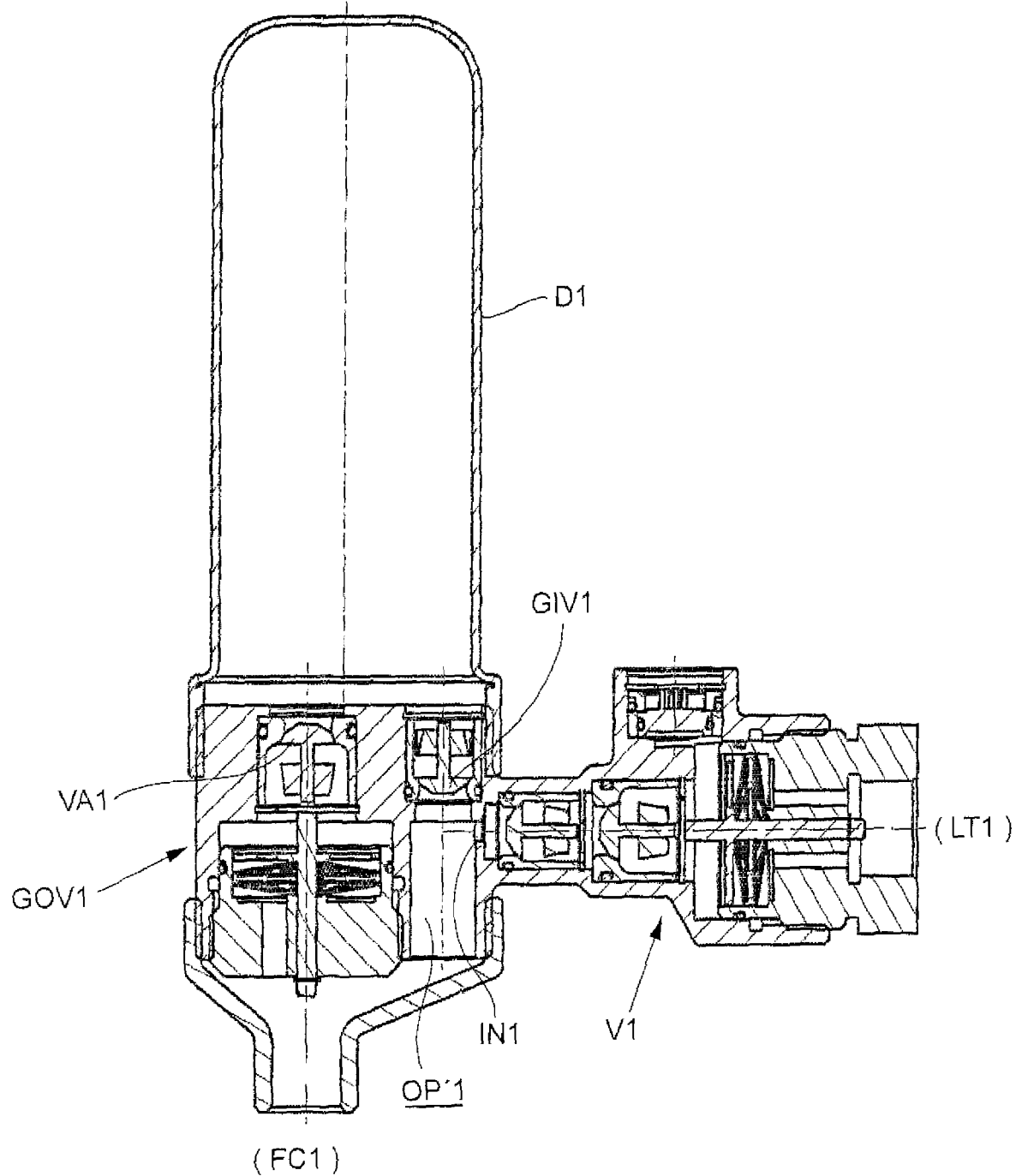

In FIG. 4, the liquid valve unit V1 is exactly like the liquid valve in FIG. 3. However, the associated dampening chamber D1 is connected to the feeding conduit FC1 via a passage OP'1 accommodating two parallel valve devices, a gas inlet valve GIV1, in the form of a non-return valve, for letting gas into the dampening chamber during the refilling of the feeding conduit FC1 when the pressure is higher than the ambient air pressure, e.g. exceeding 0.1 bar over-pressure, and a gas outlet valve GOV1, which will permit gas to flow back into the feeding conduit FC1 during evacuation of the latter. The gas outlet valve GOV1 will open when there a pressure difference exceeding a set value, e.g. 2 to 3 bars, is reached. The gas outlet valve is structured like the liquid valve unit V1 but has only one check valve (non-return valve) VA'1. Even when the pressure difference is reduced during evacuation, the gas outlet valve will stay open as long as there is a small pressure difference, and it may even stay open when the pressure difference has been reversed. Then, during the subsequent refilling with water, the entering water will cause the gas outlet valve to shift to its closed position. When a pressure of about 0.2 bar overpressure has been reached, the gas inlet valve GIV1 will open and let gas, and possibly some water, flow into the dampening chamber. The gas outlet valve GOV1 will stay closed during the tapping of hot water through the liquid valve V1.

Figure 2:
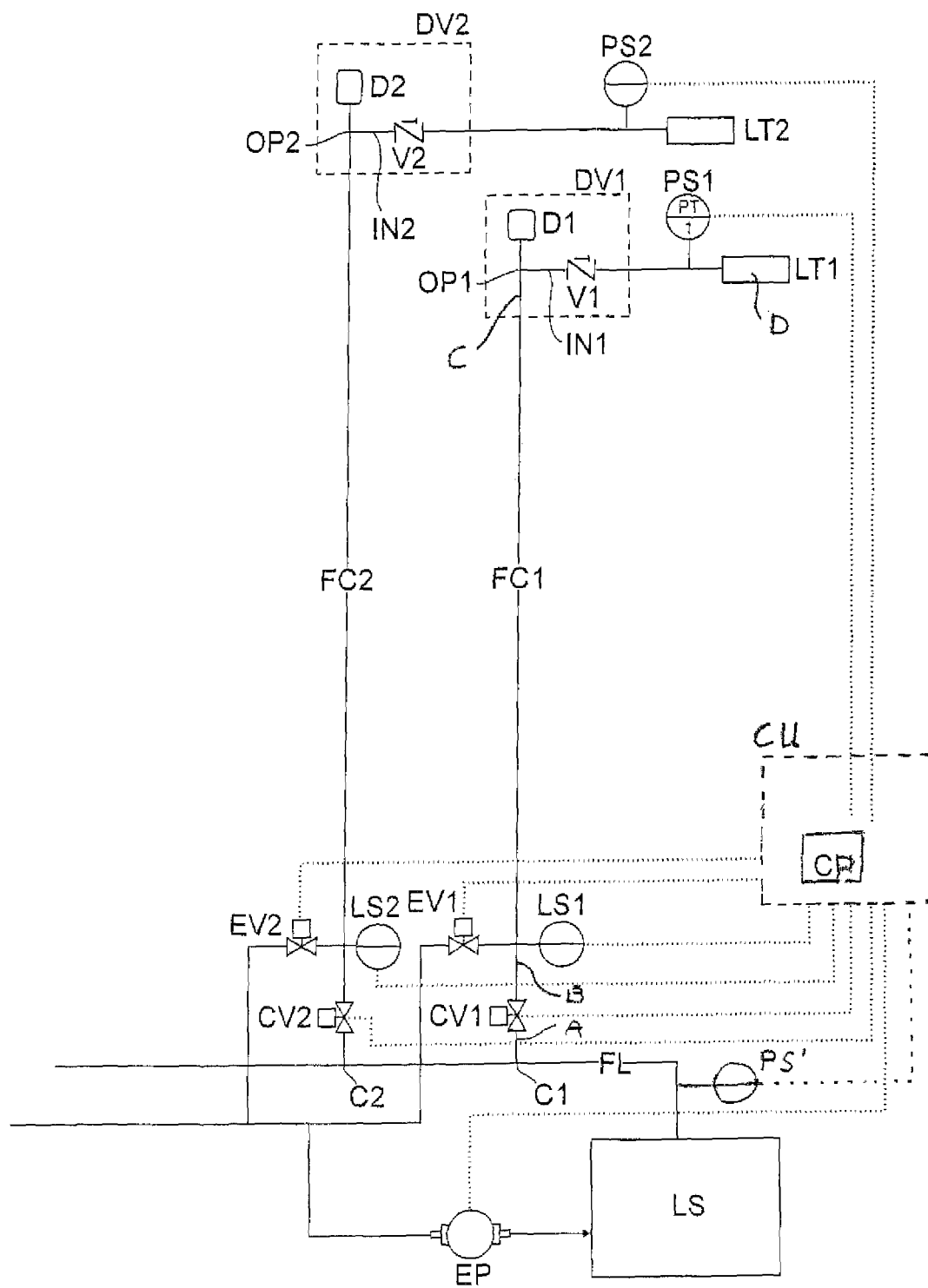
FIG. 2 shows, likewise schematically, a fluid distribution system, basically as disclosed in the earlier Swedish patent application No. 1550941-7 (filed 2 Jul. 2015), where the fluid flow measurement method and apparatus according to the present invention is implemented.

The valve arrangement with the parallel outlet and inlet valves GOV1, GIV1 will ensure that the gas in the dampening chamber D1 will stay there when the liquid valve V1 opens, with an accompanying pressure reduction in the feeding conduit FC1, until a steady state is reached for the water flowing out through the valve V1 to the associated hot water tap unit (LT1 in FIG. 2). In this way, it is avoided that air or gas will flow through the liquid valve V1.

Figure 5:
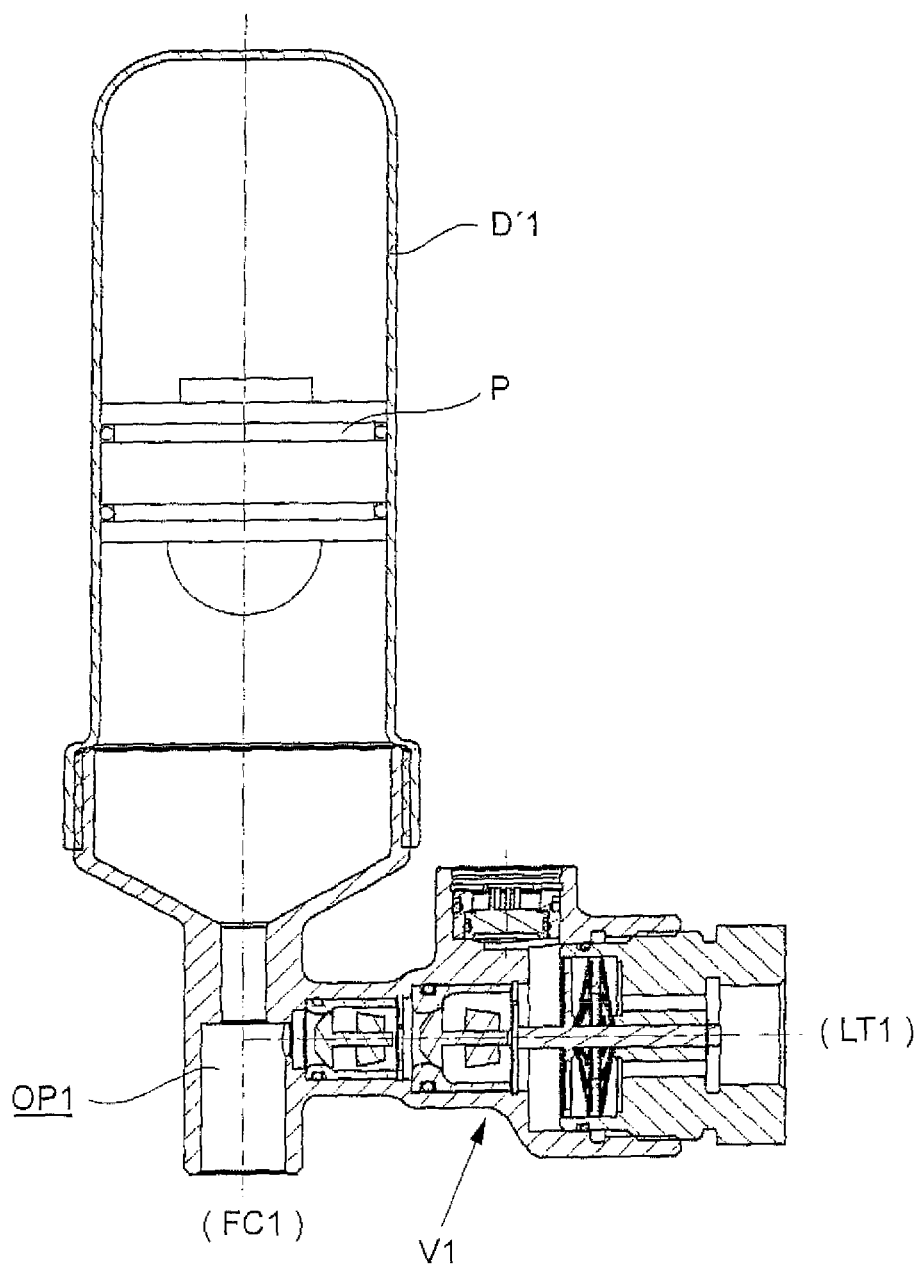
Figure 6:
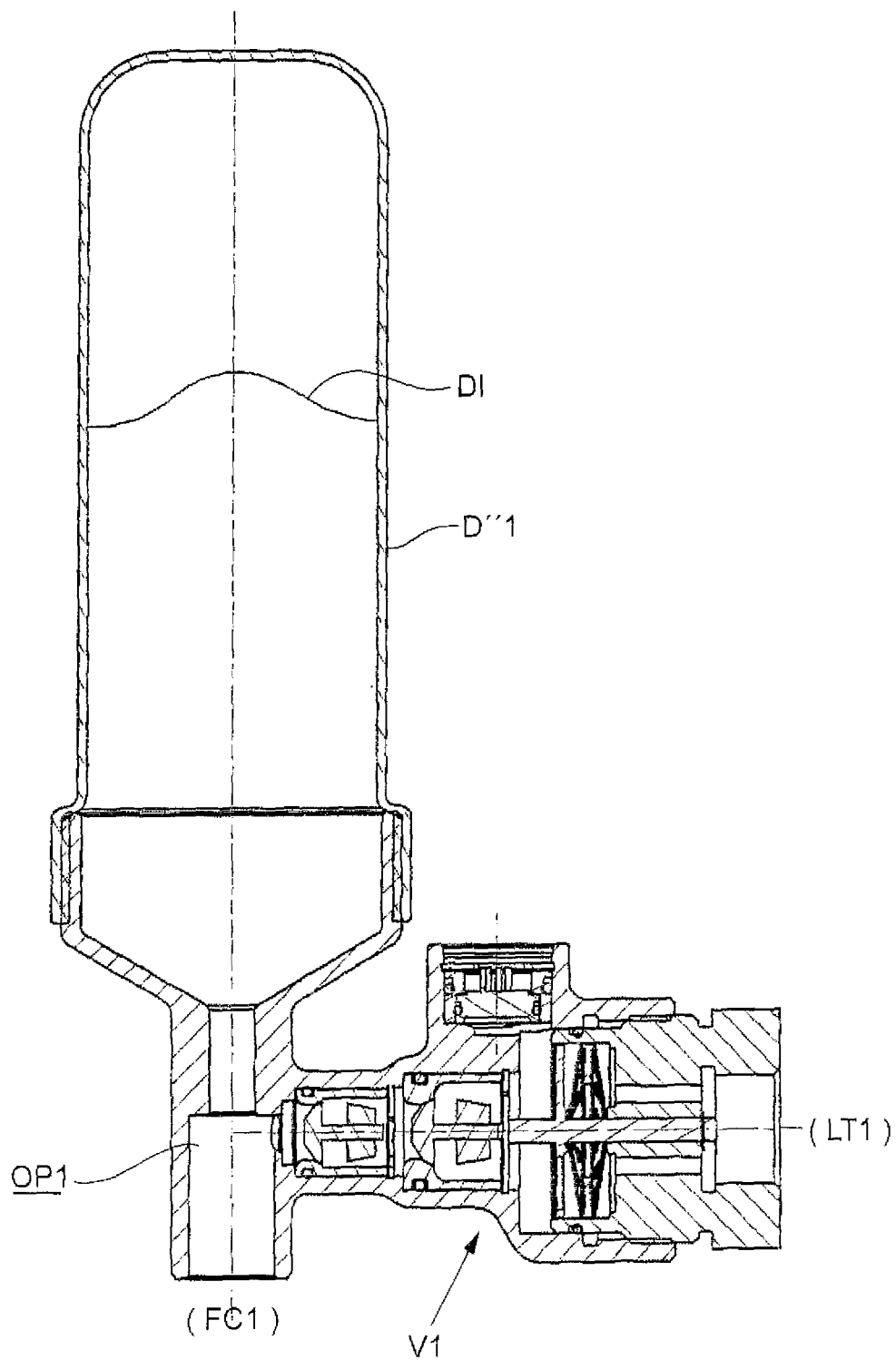

The dampening chamber may have a free inner space, as shown in FIGS. 3 and 4, or it may have a displaceable piston P as shown in FIG. 5 for the dampening chamber D'1 or a flexible diaphragm DI as shown in FIG. 6 for the dampening chamber D"1. The piston P or the diaphragm will define an innermost compartment having a preset initial gas pressure which will vary but the gas in this compartment will not mix with the water during the refilling step.

Figure 7A:
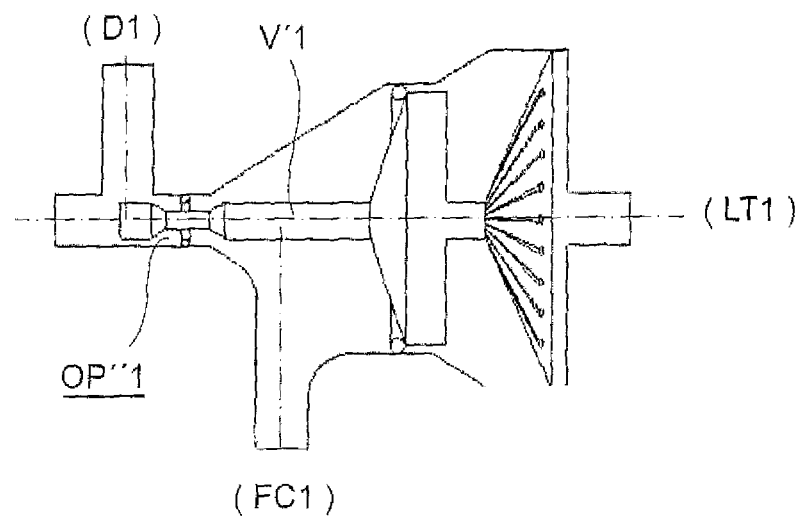
Figure 7B:
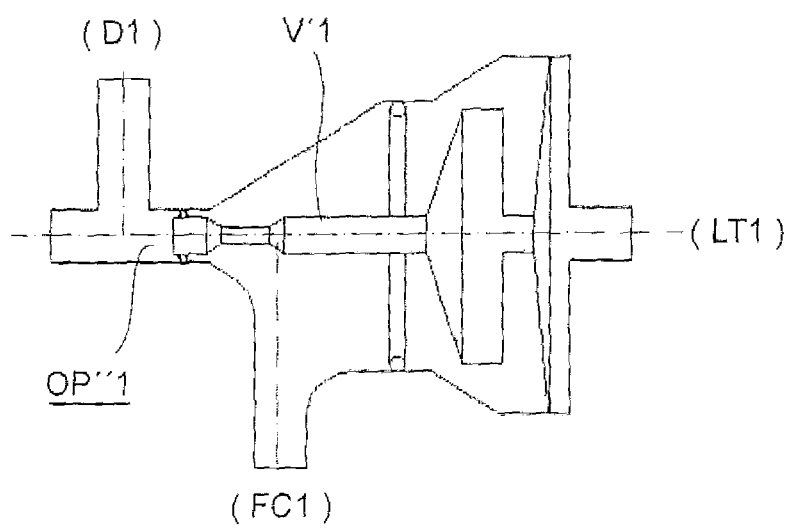

The liquid valve may be structured differently, e.g. as shown in FIGS. 7A and 7B, where an elastomeric body V1 is disposed in the passage OP"1 between the feeding conduit FC1 and the dampening chamber D1 and is displaceable between a position (FIG. 7A) where the passage OP"1 is open (and the liquid valve part to the right is closed) and a position (FIG. 78) where the passage OP"1 is closed (and the liquid valve part to the right is open). The latter position is taken when hot water is flowing to the hot water tap unit LT1, whereas the other position is taken during the other phases of the cycle.

FIGS. 8, 8A, and 8B show an embodiment of the dampening valve DV'1 which is especially compact. Here the liquid valve V1 is disposed centrally within a housing H defining an internal dampening chamber D1. The inlet IN1 is located in an open passage OP1 between the feeding conduit FC1 and the dampening chamber D1. The inlet IN1, in the form of a so small orifice, communicates with the liquid valve unit V1 via a conduit CO. The inner diameter of the conduit and the orifice inlet IN1 are such that even during evacuation of the feeding conduit FC1, water will remain in the conduit CO and prevent that gas enters into the liquid valve V1. Of course, in this case as well, the threshold level of the valve V1 is high enough to ensure that liquid (hot water) will reach the inlet IN1 before the valve V1 opens and permits the water to flow into the water tap unit LT1.

Those skilled in the art can modify the method and the liquid distribution system within the scope defined by the appended claims. For example, as indicated above, it would be possible to use the system for cold liquids rather than hot ones. The feeding conduits may consist of metal tubing, or plastic hoses. Of course, the threshold pressure level of the liquid valve V1, V2, etc. may be variable, so as to be set at a suitable value in each case, and it is also possible to vary these threshold pressure levels so as to optimize the system and the dampening characteristics at each dampening valve unit DV1, DV2, etc. Possibly, the volumes of the dampening chambers may also be variable.

As indicated above, it is a great advantage that there is no discharge of air or other gas during normal operation of the system. The dampening chamber is closed in relation to the ambient air, and the other fittings and connections should be air tight, even at very low or rather high pressures. There is no need for letting in ambient air through an inlet air valve, as was the case in the prior art systems, Therefore, the system will operate swiftly with a high refilling velocity and with great reliability and, therefore, at rather low service costs after a proper installation in a building.

The system may also be used in other units than buildings, e.g. in large vessels (water or air-borne) or moving vehicles, or in other units where there is a need for distributing hot or cold liquid to various tapping units.

Detailed Description of the Present Invention Concerning a Fluid Flow Measurement Method and Apparatus Reference is now made to drawing FIG. 2, which has been explained above in respect of the fluid distribution system as such.

According to the present invention, concerning fluid flow measurement, there have been added a pressure sensor PS' in the feed line FL adjacent to the centrally located fluid source LS. A fluid distribution unit, comprising the feed line FL from the liquid source, the control valves CV1, CV2, etc., the separate evacuation valves EV1, EV2, etc. and the jointly connected evacuation pump EP, will provide a relatively stable system fluid pressure to the separate feeding conduits FC1, FC2. However, when the control valves CV1, CV2 are being closed, the fluid pressure in the respective feed line FC1, FC2, etc. will generally be different from the system fluid pressure prevailing in the liquid source LS. Also, upon opening the respective control valve CV1, CV2, etc., the fluid pressure downstream (as seen from the fluid source LS) the respective feed point C1, C2, etc. of each feeding conduit FC1, FC2, etc. will drop along the feed conduit, and also in the respective associated liquid tap unit LT1, LT2.

Accordingly, a fluid pressure sensor can be arranged anywhere along the respective feeding conduit FC1, FC2, etc. all the way from the feed point C1, C2, etc., and in the associated liquid tap unit LT1, LT2, etc. In the example shown in FIG. 2, such a fluid pressure sensor PSI, PS2, etc, is located between a main valve V1 and the liquid tap unit LT2. However, the location of this fluid pressure sensor may be different, as indicated in FIG. 2 with the letters A, B, C and D, i.e. just downstream the feed point C1, downstream the control valve CV1, adjacent to the inlet 1N1 to the liquid tap unit LT1, or somewhere in the liquid tap unit LT1 itself.

This arrangement of the first fluid pressure sensors PS1, etc. and the second reference fluid pressure sensor PS' adjacent to the fluid source LS makes it possible to measure the pressure drop in each feeding conduit, between a respective one of the first fluid pressure sensor and the second fluid pressure sensor serving as a reference. This pressure drop is a function of the fluid flow through the associated feeding conduit, among other factors, and it is therefore possible to calculate the fluid flow (fluid mass per time unit) on the basis of the pressures sensed by each such pair of first and second fluid pressure sensors, and the pressure difference between these two sensors. Accordingly, for this purpose, there is a special calculation part CP included in the control unit CU being adapted to make such calculations.

Normally, it is necessary to calibrate the system in order to obtain correct fluid flow values. This can be done, e.g. by the use of a flow meter (not shown on the drawing, e.g. of a standard kind) which is inserted temporarily in the respective feeding conduit, e.g. adjacent to either end thereof, at an initial calibration step. Then, the measured fluid flow value, corresponding to a set of parameters, including the sensed pressures and the difference between these pressures, are stored in the calculation part CP of the control unit, so that the correct fluid flow value can be determined (calculated) at a later point of time.

The actual measurements of the fluid flow values only have to be carried out, when there is an actual flow of fluid in a particular feeding conduit FC1, FC2, etc., i.e. after the associated control valve CV1, CV2, etc. has opened. For example, the existence of a flow in the feeding conduit can be determined by the associated level sensor LS1, LS2, etc. located downstream of the associated control valve CV1, CV2, etc.

In practice, the pressures should be determined only after the refilling of the feeding conduit has been completed, after activation of a fluid tap in the associated fluid tap unit LT1, LT2, etc. At first, the pressures will vary considerably during a transient, initial phase before a steady or constant flow Is obtained. This refilling phase, lasting only for a few seconds, does not have to be recorded, since there will later be a corresponding evacuation phase, where a corresponding amount of fluid and energy will be fed back to the liquid source. So, it is quite proper to eliminate theses phases from the measurements.

Preferably, but not necessarily, the measurements and the subsequent calculations of fluid flow values are carried out periodically in the calculation part CP of the control unit CU, at a frequency which will properly take into account normal variations in the fluid consumption in each fluid tap unit LT1, LT2, etc. Thus, the flow variations occurring when one or more additional fluid taps are activated or closed (in the same fluid tap unit) should be taken into account, so that a correct calculation of the actual fluid consumption over time is recorded and stored in the control unit. The data collected may be transferred regularly or batch-wise to a central administrator, so that the costs can be charged correctly for each fluid tap unit LT1, LT2, etc.

Preferably, the amount of water and/or the amount of thermal energy consumed in each fluid tap unit (LT1, LT2, etc.) should be recorded regularly. The thermal energy can be calculated upon measuring, determining or calculating the temperature of the flowing fluid in each separate feeding conduit. Possibly, there should be temperature sensor (not shown) in each feeding conduit for this purpose. However, in case the temperature is regulated and held constant in the fluid distribution unit (at the bottom of FIG. 2), there may not be a need for such measurements. Rather, a predetermined or fixed temperature can be used for these calculations.

As to an initial calibration of the system, one or more of the following parameters should preferably be taken into account:
  The pressure reduction caused by the length of each separate feeding conduit (FC2, FC2, etc.),
  the difference in vertical levels between the first and second fluid pressure sensors (PS1, PS2, etc.) in each separate feeding conduit,
  any pressure drop at said fluid inlet (IN1, IN2, etc.) or a main fluid valve (V2, V2, etc.) in each separate fluid tap unit (LT1, LT2, etc.) in each separate fluid tap unit (LT1, LT2, etc.),
  any flow value of a flow meter being temporarily used in each separate feeding conduit or adjacent to the fluid inlet in each fluid tap unit (LT1, LT2, etc.), and/or
  any pressure in a parallel fluid distribution system connected to the same fluid tap unit (LT1, LT2, etc.).

Preferably, at least one of these parameters should be taken into account also during each flow measurement, except for the parameter relating to a flow meter, an object of the invention being to avoid the cost for such flow meters in each feeding conduit.

Of course, any skilled person can modify the measurement method and apparatus within the scope of the appended claims. In particular, the software in the calculation part CP of the control unit CU can be adapted to a particular installation of a fluid distribution system, e.g. depending on local or national regulations, climate conditions and other specific factors. Also, the calibration, e.g. when initially installing a fluid distribution system, can be carried out while taking such conditions into account.

The invention claimed is:

1. A method for measuring of fluid flow rate in a fluid distribution system, comprising:
  providing a centrally located fluid source which is connected via separate feeding conduits to a number of fluid tap units, each including a fluid inlet and at least one fluid tap, wherein the fluid pressure in each separate feeding conduit, upon opening said at least one fluid tap and a respective control valve being located between the centrally located fluid source and the respective feeding conduit, will drop along the feeding conduit during a tapping operation, whereas the fluid pressure in said fluid source is maintained at a substantially constant pressure,
  providing, for each said separate feeding conduit, a first fluid pressure sensor located anywhere along said separate feeding conduit or in the associated fluid tap unit, and a second fluid pressure sensor, serving as a reference pressure sensor common to all of said feeding conduits and being located adjacent to said centrally located fluid source, and
  electronically connecting each of said first and second fluid pressure sensors to a control unit adapted to periodically determine the fluid pressures at said first and second fluid pressure sensors, including the difference between these two fluid pressures, and, on the basis of said determination of said fluid pressures and said pressure difference, calculate the flow rate of fluid flowing through each separate feeding conduit, at least as long as there is a fluid flow at said inlet to any fluid tap unit.

2. The method of claim 1, wherein said calculation of the flow rate is also based on an initial calibration of the fluid distribution system, where a fluid flow meter is used temporarily in the system.

3. The method of claim 1, wherein said calculation is carried out periodically.

4. The method of claim 1, wherein said calculation is made over a period of time so as to calculate and record at least one of the following:
  the amount of fluid consumed in each fluid tap unit during said period of time, and
  an amount of thermal energy consumed in each fluid tap unit during said period of time, upon also measuring, determining or calculating the temperature of the flowing fluid in each separate feeding conduit.

5. The method of claim 1, wherein said determination and said calculation are made in parallel water distribution systems, one for cold water, and one for hot water, any mixing of cold and hot water occurring within each fluid tap unit, downstream the fluid inlets to each fluid tap unit.

6. The method of claim 1, wherein an initial calibration of the fluid distribution system takes into account at least one of the following parameters:
   the pressure reduction caused by the length of each separate feeding conduit,
   the difference in vertical levels between said first and second fluid pressure sensors in each separate feeding conduit,
   any pressure drop at said fluid inlet or a main fluid valve in each separate fluid tap unit,
   any flow rate measured by a flow meter being temporarily used in each said separate feeding conduit or adjacent to said fluid inlet in each fluid tap unit during said initial calibration, and
   any pressure in a parallel fluid distribution system connected to the same fluid tap unit.

7. The method of claim 6, wherein at least one of the parameters is taken into account also during each flow rate measurement.

8. The method of claim 1, wherein each of said separate feeding conduits, during the entire operation of the fluid distribution system, is kept in communication with an associated dampening chamber via an associated passage accommodating said inlet to an associated fluid tap unit, said separate feeding conduit, said associated passage and said associated dampening chamber forming, in use, a closed system which, in respect of remaining gas therein, is separated from the ambient air.

9. The method of claim 8, wherein a main fluid valve is connected between said fluid inlet and the associated fluid tap unit.

10. The method of claim 8, wherein each of said separate feeding conduits is evacuated by means of pump after completion of each tapping operation in the associated fluid tap unit, so that the fluid flows backwards towards said centrally located fluid source, and the feeding conduit thereafter contains only gas being retained therein, at a pressure being substantially lower than the ambient air, and wherein, upon activating a tap in the associated fluid tap unit, the associated separate feeding conduit is refilled with fluid until a pressure substantially exceeding the ambient air pressure is reached at said fluid inlet, thereby causing a main fluid valve at said fluid inlet to open.

11. The method of claim 1, wherein the fluid is a liquid.

12. A flow measurement apparatus for measuring a flow of fluid in a fluid distribution system, comprising a centrally located fluid source which is connected via separate feeding conduits to a number of fluid tap units, each including at least one fluid tap, wherein the fluid pressure in each separate feeding conduit, upon opening said at least one fluid tap and a respective control valve being located between the centrally located fluid source and the respective feeding conduit, will drop along the feeding conduit during a tapping operation, whereas the fluid pressure in said fluid source is maintained at a substantially constant pressure;
   a first fluid pressure sensor located in each of said feeding conduits or in the associated fluid tap unit,
   a second fluid pressure sensor, serving as a common reference pressure sensor and being located adjacent to said centrally located fluid source, and
   a central control unit being coupled to said first and second fluid pressure sensors and being adapted to periodically determine the fluid pressures at said first and second pressure sensors, including the respective difference between these two pressures,
   the central control unit also including a calculation part adapted to calculate, on the basis of said determination of said fluid pressures and said respective pressure difference, the flow rate of fluid through each of said separate feeding conduits.

13. The flow measurement apparatus of claim 12, wherein there are two water distribution systems arranged in parallel, one for cold water, and another one for hot water.

14. The flow measurement apparatus of claim 13, wherein said control unit is adapted to measure said fluid flow rate over a period of time so as to calculate and record at least one of the following:
   the amount of fluid consumed in each fluid tap unit during said period of time, and
   an amount of thermal energy consumed in each fluid tap unit during said period of time, upon also measuring, determining or calculating the temperature of the fluid flowing in each separate feeding conduit.

15. The flow measurement apparatus of claim 12, wherein the apparatus also comprises a fluid flow meter being used temporarily for an initial calibration of the fluid distribution system.

16. The flow measurement apparatus of claim 12, wherein said calculation part of said control unit is adapted to make fluid measurements over a period of time so as to calculate and record at least one of the following:
   the amount of fluid consumed in each tap unit during said period of time, and
   an amount of thermal energy consumed in each tap unit during said period of time, upon also measuring, determining or calculating the temperature of the flowing fluid in each separate feeding conduit.

17. The flow measurement apparatus of claim 12, wherein the fluid is a liquid.

* * * * *